W. VON RACZYNSKI.
HAULING CABLE.
APPLICATION FILED AUG. 1, 1918.

1,430,042.

Patented Sept. 26, 1922.

Inventor
Waldimir Von Raczynski.
By Herbert Langner
Attorney

Patented Sept. 26, 1922.

1,430,042

UNITED STATES PATENT OFFICE.

WLADIMIR von RACZYNSKI, OF BISMARCKSHOHE, NEAR LUBASCH, GERMANY.

HAULING CABLE.

Application filed August 1, 1918. Serial No. 247,828.

*To all whom it may concern:*

Be it known that I, WLADIMIR VON RACZYNSKI, a subject of the German Emperor, residing at Bismarckshohe, near Lubasch, in the Kingdom of Prussia, Germany, have invented certain new and useful Improvements in Hauling Cables, of which the following is a specification.

The inventor has devised a traction system for agricultural machines such as ploughs, for which system a patent has been applied for in this country (see application Serial Number 802947) as well as in many other countries. This system comprises the combination of portable power driven hauling means, a source of current, a plurality of agricultural machines, electric motors on said agricultural machines, a flexible hauling cable between each of said agricultural machines and said hauling means and an insulated electrical conducting core encased within each of said cables and connecting said motors with said source of current.

The above system works in such manner that the portable power driven hauling means are positioned in the middle of a field to be worked. One of said agricultural machines is drawn by the cable from one end of the field to the portable power driven hauling means, while another agricultural machine is idle, running like an ordinary automobile back to the other end of the field, driven by electric current supplied from the source of current to the electric motor of such machine. Said source of current is arranged on the portable power driven hauling means. The current is conducted by the insulated conducting core in the one direction and is returned by the body or the external casing of the hauling cable, which casing is designed to transmit the hauling power during the working course of the agricultural machine.

Great difficulty has been experienced in the practical use of the above system by the cable being destroyed very soon by a short circuit.

Now, from long practical experience and tests, the inventor has found that this condition is caused by the length of the cable changing under the alternate tension and release of the cable.

For instance, a cable of a length of 300 m. is lengthened by the tension not less than 30 cm. While in the body or external casing of the cable, which consists of elastic steel, the alteration of length is uniformly distributed, this is not the case with the insulated core which consists usually of copper, but the biggest part of the lengthening, or the whole lengthening throughout, is produced by stretching the weakest part of the core. Therefore this part of the core is stretched beyond its elastic limit and suffers a permanent elongation. Each time the hauling ceases and the cable is relieved of strain the external casing springs back to its original length while the core does not spring back. The core therefore is compressed longitudinally and thickened so that knots and bulbs are formed in the core. This effect is increased by the alternate tension and release in such a way that the thickened parts of the core squeeze away or cut through the insulation and cause a short circuit with the external casing.

The inventor has found that this condition may be avoided by constructing a copper core which will follow the elastic alterations of length of the steel body of the cable without a permanent deformation. According to the invention this may be obtained by providing points in the core at short intervals, which are very yieldable whereby a uniform distribution of the elongation is secured. This can be done by forming the core of short slidably connected pieces each having a length of about 2 m. These pieces may be made from solid wire or from strands of wire and such pieces may be connected by the adjacent ends of the pieces being inserted in tubular metallic sleeves, or the pieces may be made solid and hollow alternately, the ends of the solid pieces being inserted in the ends of the hollow pieces.

Other modifications, features and advantages of the invention are described in connection with the drawings.

In these drawings—

Figure 1:
Figure 1 is a side elevation of parts of a core according to one form of the invention, the connecting sleeve being shown in section.

According to Figure 1 the core of the cable consists of short pieces $a$, each having a length of 2 m. for instance. The adjacent ends of the parts $a$ are enclosed in a metallic sleeve $b$. The core is lined with or enveloped in a suitable insulation $d$ and the whole is embedded in an ordinary hauling cable $f$ forming the external casing or armour for the electrical conductor. The cable may advantageously be of the known "mixed breed" type composed of strands wound alternately to the right and to the left.

Figure 2:
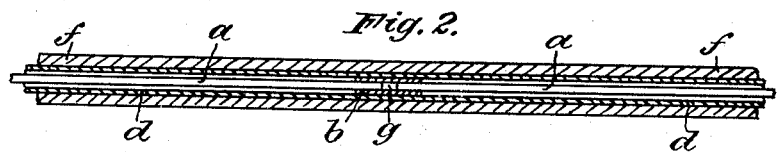
Figure 2 is a longitudinal section of a hauling cable provided with such a core.

When the cable is not hauling or transmitting mechanical power, the flat front faces of the pieces $a$ abut. If, however, the cable is hauling and is lengthened thereby, the ends of the pieces $a$ are separated by an interval $g$, as shown in Figure 2 and as indicated in dotted lines in Figure 1. This interval, of course, disappears or diminishes as soon as the hauling action ceases.

Applicant is well aware that it has previously been proposed to compensate for the alterations in the length of electrical cables by providing them with yielding joint boxes. However whereas such joint boxes are located at long intervals in ordinary cables depending on the length of cable which can be manufactured in one continuous piece; according to the present invention, the electrical conductor is divided into very short pieces connected by yielding joints.

Figure 3:
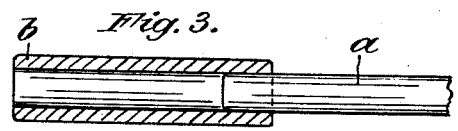
Figure 3 is a view similar to Figure 1 of a modified form of core.

According to one modification shown in Figure 3, the electrical conductor is composed alternately of solid pieces $a$ and hollow or tubular pieces $b$, the ends of the pieces $a$ being inserted in the pieces $b$. The pieces $a$ and $b$ in Figures 1–3 may be solid or composed of or woven from several strands of wire like cables.

Figure 4:
Figure 4 is a fragmentary longitudinal section of another modification of the core.
Figure 5:
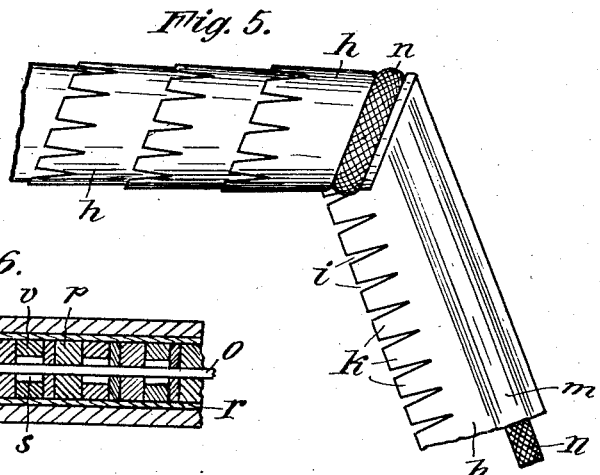
Figure 5 is an elevation of a metallic band for forming a core in accordance with Figure 4.

According to Figure 4 the electrical conductor is wound like an ordinary spiral-hose pipe from a flat metal band $h$ (see also Figure 5). The overlapping joints of such hose-pipe are strongly compressed from the outside by the strands of the outer casing or cable being twisted very strongly and tightly during manufacture in order to transmit the high hauling power without an excessive deformation. On account of such compression of the overlapping joints the hose-pipe forms an electrical conductor having an annular or circular cross-section and giving a rectilinear passage to the current, as indicated by the arrow in Figure 4. This is an important difference compared with the known hose pipe shaped conductors of ordinary cables, the armour of which is much more flexible and yieldable than a heavy strained strongly twisted hauling cable. Therefore in such ordinary cables the path of the current is not rectilinear but screw-line shaped and therefore the cross-section of the conductor would not be sufficient for applicant's purposes. For understanding this it must be remembered that a hauling cable for ploughs must transmit 100 H. P. or more and on the other hand may not have a diameter of more than 24 mm. In the very narrow interior space of such a normal hauling cable an electrical conductor for more than 25 H. P. must be arranged so that the question of cross-section of the electrical conductor is of highest importance.

For improving the transmission of current at the joints special provisions may be made. For instance (see Fig. 5) the band $h$ may be provided with slits $i$ at one edge or on both edges. By such slits resilient tongues $k$ are formed lying with a spring action against the overlapping part of the band $h$.

Further the conductivity may be increased by embedding in a groove $m$ of the band $h$ a metallic cord, strand or packing $n$ made of fine copper wire or the like, slits $i$ being provided or not.

Figure 7:
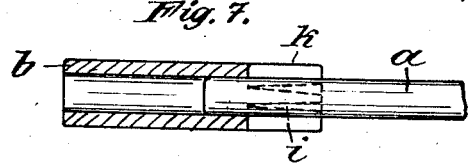
Figures 7 and 8 are views similar to Fig. 3 of still further modifications.
Figure 8:
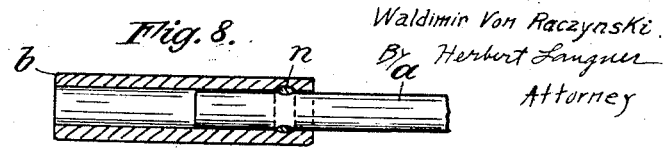

If desired, the conductivity at the joints may be increased also in the modifications of Figures 1–3 in the same manner as in Figure 4 by splitting the parts $a$ or $b$ (see Fig. 7) or both or by interposing between the parts $a$ and $b$ a metallic packing or cord $n$ (see Fig. 8).

Figure 6:
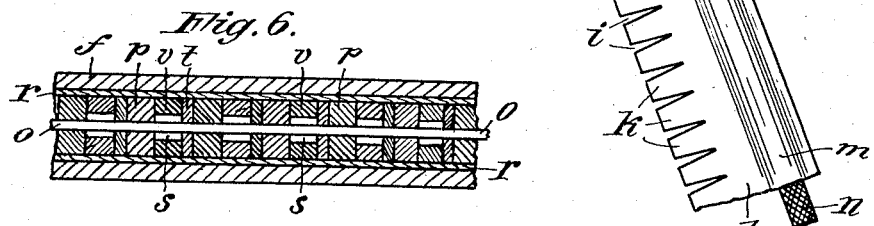
Figure 6 is a longitudinal section of another modification of the cable and core.

According to Figure 6 the hauling strain is distributed uniformly throughout the electrical conductor in the following way:

The continuous electrical conductor-wire, strand or cable $o$ is encircled by discs $p$ of hard rubber firmly pressed against the conductor $o$ on the one hand and against the insulating lining $r$ of jute and the like covering the interior space of the hauling cable $f$. Between two successive discs $p$ of the kind described are arranged other discs $v$ also made from hard rubber or the like, surrounding the conductor $o$ with free play or with an annular slot $s$.

Between each successive pair of discs $p, v$ is arranged a thin disc $t$ made of soft rubber or the like for giving a better flexibility. In this way the conductor is firmly clamped in the discs $p$ transmitting the hauling strain to the conductor at numerous uniformly distributed points. Then the stretching is given mainly by those parts of the conductor lying freely within the discs $v$ and therefore the strain is uniformly distributed. In this way the undivided conductor is practically dissolved in a continuous series of strain transmitting elements and extension elements.

What I claim and desire to secure by Letters Patent of the United States is:

1. In a flexible hauling cable, the combination with an external hauling casing, of a conducting core comprising a metallic strip spirally wound; and a metallic packing contacting with and between overlapping portions of the core.

2. In a flexible hauling cable, the combination with an external hauling casing, of a conducting core comprising a metallic strip spirally wound and a metallic packing on said strip, one edge of said strip being slotted to form resilient tongues.

3. In a flexible hauling cable, the combination with an external hauling casing, of a conducting core comprising a metallic strip spirally wound and resilient tongues on said strip overlapping adjacent portions of said strip and adapted to be electrically connected to the same.

In testimony whereof I have hereunto set my hand in the presence of a witness.

WLADIMIR von RACZYNSKI.

Witnesses:
Dr. A. Fankowski,
von Imonicoski.